J. S. REESMAN.
PIPE CONNECTION SEAL.
APPLICATION FILED APR. 17, 1920.
1,361,615.
Patented Dec. 7, 1920.
Fig. 1.
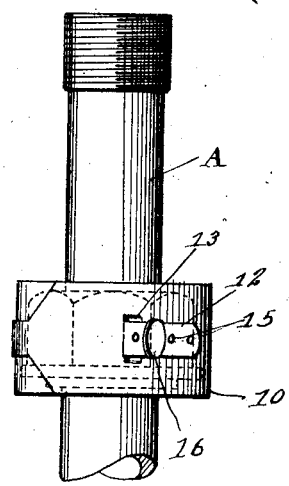
Fig. 2.
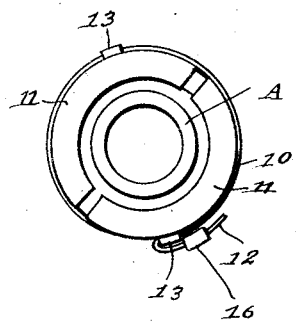
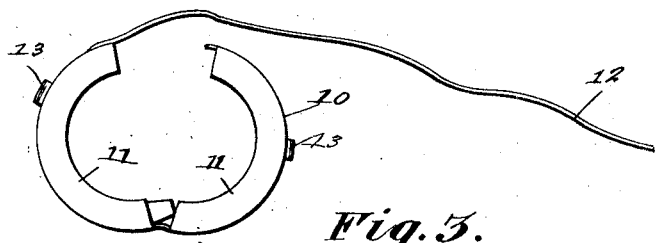
Fig. 3.
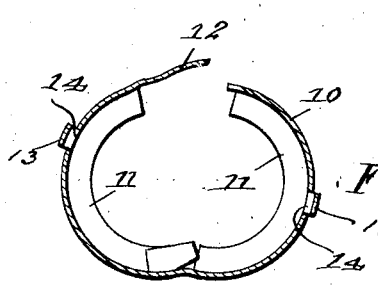
Fig. 4.
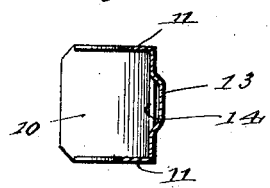
Fig. 5.
Witnesses
R. A. Thomas.
Inventor
John S. Reesman
By Victor J. Evans,
Atty.

UNITED STATES PATENT OFFICE.

JOHN S. REESMAN, OF HIGHLAND PARK, ILLINOIS.

PIPE-CONNECTION SEAL.

1,361,615.

Specification of Letters Patent.  Patented Dec. 7, 1920.

Application filed April 17, 1920. Serial No. 374,624.

*To all whom it may concern:*

Be it known that I, JOHN S. REESMAN, a citizen of the United States, residing at Highland Park, in the county of Lake and State of Illinois, have invented new and useful Improvements in Pipe-Connection Seals, of which the following is a specification.

This invention relates to devices for sealing pipe connections such as those employed on gas and water meters so that it will be impossible for an unauthorized person to tamper with the connection without evidence of the fact being clearly visible.

An important and more specific object is the provision of a pair of separable flanged members engaged upon a pipe connection or coupling in embracing relation thereto and having associated therewith means whereby a lead or wire seal may be applied.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device in position upon a pipe coupling,

Fig. 2 is a plan view thereof,

Fig. 3 is a similar view showing the parts disconnected from a pipe coupling,

Fig. 4 is a detail sectional view through one side of the device, and

Fig. 5 is a sectional view through the entire device at right angles to Fig. 4.

Referring more particularly to the drawings, the letter A designates a pipe coupling such as is used in connection with meters of different types. In carrying out my invention I provide a seal which is formed from a sheet of metal 10 having flanges 11 at its edges and bent into cylindrical form so as to be engaged upon the pipe coupling A, it being apparent that the device is formed from thin or pliable metal which may itself be bent in order to obviate any necessity for providing hinge knuckles to permit movement of the device when applying the same to or removing it from a pipe coupling. Formed integrally upon one end of the sheet 10 is a reduced tongue 12 which has considerable length and which is engageable within retaining members 13 formed in the sheet by slitting the same, as shown at 14, and then bending the material between the slits to form the straps 13. The free end of the tongue has formed therein a plurality of holes 15 with any one of which may be associated a seal 16 formed of lead and preferably molded onto the tongue.

In the application of the device it will be seen that it being initially open it is placed upon the coupling A and then pressed together into cylindrical form so as to embracingly engage the coupling. The tongue 12 is then threaded through the retaining members 13 and pulled tightly to hold the device in cylindrical form after which the tongue is preferably bent backwardly upon itself, as shown at 17, to prevent the device from springing open. The seal 16 is then melted onto the projecting end of the tongue in such a way that the material of the seal will enter one of the holes 15. It will be obvious that the device cannot be removed from the coupling until after the tongue has been disengaged from the retaining members 13 and it will be equally obvious that this cannot be accomplished until the seal is removed. The device is thus well adapted to detect the fact that an attempt has been made to tamper with the connection for some illegitimate purpose.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:

1. A sealing device for pipe couplings comprising a sheet of material having side flanges, the sheet being bent into cylindrical form in embracing engagement with the coupling, retaining members on the sheet at spaced points, a reduced tongue carried by one edge of the sheet, passed through said retaining members, and holding the device in cylindrical form, and a seal disposed upon the tongue.

2. A sealing device for pipe couplings comprising a sheet of pliable material disposed in encircling engagement upon the coupling and having at its side edges inturned flanges engaging opposite sides of the coupling, said sheet of material being slit at spaced points to define retaining members offset outwardly, a reduced tongue on one end of said sheet, passed through said retaining members, and bent backwardly upon itself at one endmost retaining member whereby to prevent expansion of the sheet, said tongue being provided with a plurality of holes, and a seal cast onto said tongue and passing through a selected one of the holes.

3. A sealing device for pipe couplings comprising a cylindrical member of flexible material provided at opposite sides with substantially semi-circular flanges, the flanges being severed at one side whereby to permit bending of the cylindrical member for engagement upon a pipe coupling, a retaining loop formed on one side of said member, and a reduced tongue formed on the opposite side and engageable within said loop, said tongue being apertured for the reception of a seal.

4. A sealing device for pipe couplings comprising a split cylindrical member formed at opposite sides with circular flanges, said flanges being severed whereby to permit bending of said member so that it may be opened for engagement upon a pipe coupling, said member being formed at one side adjacent the split with an upstruck loop and being formed at the opposite side with a second upstruck loop, and a reduced extension formed integrally upon one edge of said member and adapted to be passed through both of said loops in partially encircling relation to said member and being formed with openings for the engagement of a seal.

In testimony whereof I affix my signature.

JOHN S. REESMAN.